United States Patent
Yamashita et al.

(12)

(10) Patent No.: US 10,328,660 B2
(45) Date of Patent: Jun. 25, 2019

(54) COMPOSITE STRUCTURE AND MANUFACTURING METHOD THEREOF

(71) Applicants: AISIN TAKAOKA CO., LTD., Toyota-shi, Aichi (JP); TOYOTA JIDOSHA KABUSHIKI KAISHA, Toyota-shi, Aichi (JP)

(72) Inventors: Yuji Yamashita, Toyota (JP); Kiyohito Kondo, Toyota (JP); Yoshimasa Sawada, Toyota (JP); Hirokazu Kawabe, Toyota (JP); Yoshiteru Inamoto, Toyota (JP)

(73) Assignees: AISIN TAKAOKA CO., LTD., Toyota-Shi, Aichi (JP); TOYOTA JIDOSHA KABUSHIKI KAISHA, Toyota-Shi, Aichi (JP)

( * ) Notice: Subject to any disclaimer, the term of this patent is extended or adjusted under 35 U.S.C. 154(b) by 152 days.

(21) Appl. No.: 15/125,538

(22) PCT Filed: Mar. 11, 2015

(86) PCT No.: PCT/IB2015/051751
§ 371 (c)(1),
(2) Date: Sep. 12, 2016

(87) PCT Pub. No.: WO2015/136451
PCT Pub. Date: Sep. 17, 2015

(65) Prior Publication Data
US 2017/0001407 A1 Jan. 5, 2017

(30) Foreign Application Priority Data
Mar. 13, 2014 (JP) ................................ 2014-050751

(51) Int. Cl.
*B32B 3/14* (2006.01)
*B32B 3/02* (2006.01)
(Continued)

(52) U.S. Cl.
CPC .............. *B32B 3/14* (2013.01); *B29C 70/345* (2013.01); *B29C 70/78* (2013.01); *B32B 3/02* (2013.01);
(Continued)

(58) Field of Classification Search
None
See application file for complete search history.

(56) References Cited

U.S. PATENT DOCUMENTS 3,855,029 A * 12/1974 Sabel ...................... E04C 2/26
156/92
4,451,528 A *  5/1984 Krause .................... B29C 70/46
428/300.4
(Continued)

FOREIGN PATENT DOCUMENTS

CN           1033140 A      5/1989
CN           1701831 A     11/2005
(Continued)

OTHER PUBLICATIONS

Machine Translation of WO 2015052352 A1, Apr. 2015 (Year: 2015).*
(Continued)

*Primary Examiner* — Jeffrey A Vonch
(74) *Attorney, Agent, or Firm* — Buchanan Ingersoll & Rooney PC

(57) ABSTRACT

There is provided a composite structure, comprising a base member(s) made of metallic material, and a reinforcement member(s) made of fiber reinforced plastic including reinforcement fibers which are aligned in a uni-direction, wherein at least one slit is formed on the reinforcement member(s) so as to extend in an orientation direction of the reinforcement fibers.

13 Claims, 6 Drawing Sheets

(51) Int. Cl.
| | | |
|---|---|---|
| *B32B 3/28* | (2006.01) | |
| *B32B 7/04* | (2019.01) | |
| *B32B 15/08* | (2006.01) | |
| *B32B 15/14* | (2006.01) | |
| *B32B 7/03* | (2019.01) | |
| *B32B 5/12* | (2006.01) | |
| *B29C 70/78* | (2006.01) | |
| *B29C 70/34* | (2006.01) | |
| B32B 5/02 | (2006.01) | |
| B32B 37/00 | (2006.01) | |
| B32B 37/18 | (2006.01) | |
| B32B 37/10 | (2006.01) | |
| B32B 37/14 | (2006.01) | |
| B29C 65/02 | (2006.01) | |
| B29C 65/00 | (2006.01) | |
| B29C 43/52 | (2006.01) | |
| B29C 43/02 | (2006.01) | |
| B29C 33/42 | (2006.01) | |
| B29C 43/36 | (2006.01) | |
| B29C 43/18 | (2006.01) | |
| B62D 29/00 | (2006.01) | |
| B29L 31/30 | (2006.01) | |
| B29C 70/46 | (2006.01) | |
| B29C 70/08 | (2006.01) | |
| B29C 70/54 | (2006.01) | |
| B29C 70/20 | (2006.01) | |
| B29L 31/00 | (2006.01) | |
| B32B 5/22 | (2006.01) | |
| B32B 5/24 | (2006.01) | |
| B32B 5/26 | (2006.01) | |
| B32B 3/26 | (2006.01) | |
| B29C 70/88 | (2006.01) | |
| B29C 43/20 | (2006.01) | |
| B29K 307/04 | (2006.01) | |
| B29K 705/00 | (2006.01) | |
| B29L 9/00 | (2006.01) | |

(52) U.S. Cl.
CPC ............... *B32B 3/28* (2013.01); *B32B 5/12*
(2013.01); *B32B 7/03* (2019.01); *B32B 7/04*
(2013.01); *B32B 15/08* (2013.01); *B32B 15/14*
(2013.01); *B29C 33/42* (2013.01); *B29C*
*43/021* (2013.01); *B29C 43/20* (2013.01);
*B29C 43/36* (2013.01); *B29C 43/52* (2013.01);
*B29C 65/02* (2013.01); *B29C 66/72141*
(2013.01); *B29C 66/7394* (2013.01); *B29C*
*66/73112* (2013.01); *B29C 66/742* (2013.01);
*B29C 70/088* (2013.01); *B29C 70/20*
(2013.01); *B29C 70/46* (2013.01); *B29C*
*70/462* (2013.01); *B29C 70/543* (2013.01);
*B29C 70/545* (2013.01); *B29C 70/885*
(2013.01); *B29C 2043/189* (2013.01); *B29K*
*2307/04* (2013.01); *B29K 2705/00* (2013.01);
*B29L 2009/00* (2013.01); *B29L 2031/003*
(2013.01); *B29L 2031/30* (2013.01); *B29L*
*2031/3002* (2013.01); *B32B 3/266* (2013.01);
*B32B 5/02* (2013.01); *B32B 5/22* (2013.01);
*B32B 5/24* (2013.01); *B32B 5/26* (2013.01);
*B32B 37/10* (2013.01); *B32B 37/144*
(2013.01); *B32B 37/18* (2013.01); *B32B*
*37/182* (2013.01); *B32B 37/187* (2013.01);
*B32B 2037/0092* (2013.01); *B32B 2250/44*
(2013.01); *B32B 2260/021* (2013.01); *B32B*
*2260/023* (2013.01); *B32B 2260/046*
(2013.01); *B32B 2262/10* (2013.01); *B32B*
*2262/106* (2013.01); *B32B 2305/07* (2013.01);
*B32B 2305/076* (2013.01); *B32B 2305/72*
(2013.01); *B32B 2305/77* (2013.01); *B32B*
*2398/10* (2013.01); *B32B 2605/00* (2013.01);
*B62D 29/001* (2013.01); *B62D 29/005*
(2013.01); *Y10T 428/2476* (2015.01); *Y10T*
*428/24314* (2015.01); *Y10T 428/24331*
(2015.01); *Y10T 428/24339* (2015.01); *Y10T*
*428/24669* (2015.01); *Y10T 428/24752*
(2015.01)

(56) References Cited

U.S. PATENT DOCUMENTS

| | | | | |
|---|---|---|---|---|
| 4,657,717 | A * | 4/1987 | Cattanach | B29C 43/3642 264/102 |
| 4,720,255 | A * | 1/1988 | Mittelstadt | B29B 15/08 156/443 |
| 4,726,924 | A * | 2/1988 | Mittelstadt | B29B 15/08 156/180 |
| 4,746,389 | A | 5/1988 | DiGenove | |
| 4,992,127 | A * | 2/1991 | Kishi | B29B 15/08 156/182 |
| 5,324,563 | A * | 6/1994 | Rogers | B29C 70/20 428/114 |
| 5,733,390 | A * | 3/1998 | Kingston | B32B 15/08 148/518 |
| 6,206,458 | B1 * | 3/2001 | Schroeder | B62D 29/046 296/187.01 |
| 6,296,301 | B1 * | 10/2001 | Schroeder | B62D 29/046 296/187.02 |
| 6,355,133 | B1 * | 3/2002 | Williams | B29C 70/205 156/296 |
| 6,460,240 | B1 * | 10/2002 | Kielies | B29C 70/088 29/469.5 |
| 6,468,613 | B1 * | 10/2002 | Kitano | B32B 15/08 428/35.8 |
| 6,474,726 | B1 * | 11/2002 | Hanakawa | B62D 25/04 296/187.12 |
| 6,595,467 | B2 * | 7/2003 | Schmidt | B23K 31/02 244/119 |
| 6,995,099 | B1 * | 2/2006 | Nishimura | B29C 70/083 442/59 |
| 7,279,059 | B2 | 10/2007 | Haque | |
| 7,468,005 | B2 | 12/2008 | Kouno et al. | |
| 7,862,453 | B2 | 1/2011 | Kouno et al. | |
| 7,905,799 | B2 | 3/2011 | Kouno et al. | |
| 2001/0036559 | A1 * | 11/2001 | Haack | B32B 15/18 428/577 |
| 2001/0048175 | A1 * | 12/2001 | Edwards | B29C 70/525 264/136 |
| 2002/0069506 | A1 * | 6/2002 | Brodt | B21D 37/16 29/505 |
| 2003/0168555 | A1 * | 9/2003 | Livi | B29C 70/44 244/132 |
| 2003/0183317 | A1 * | 10/2003 | Czaplicki | B29C 70/70 156/79 |
| 2004/0048022 | A1 * | 3/2004 | Pratt | A63B 60/00 428/36.91 |
| 2004/0108705 | A1 * | 6/2004 | Witucki | B62D 21/00 280/781 |
| 2005/0023728 | A1 * | 2/2005 | Benson | B29C 70/388 264/258 |
| 2005/0048260 | A1 * | 3/2005 | Modin | B29C 70/545 428/138 |
| 2005/0112348 | A1 * | 5/2005 | Schmidt | B32B 3/08 428/292.1 |
| 2005/0136256 | A1 * | 6/2005 | Vichniakov | C22C 47/068 428/375 |
| 2005/0245328 | A1 | 11/2005 | Kouno et al. | |
| 2005/0263239 | A1 * | 12/2005 | Foo | B29C 63/0021 156/94 |
| 2006/0110588 | A1 * | 5/2006 | Merriman | B29C 70/865 428/292.1 |

(56) References Cited

U.S. PATENT DOCUMENTS

| | | | |
|---|---|---|---|
| 2006/0141884 A1 | 6/2006 | Haque | |
| 2006/0208135 A1* | 9/2006 | Liguore | B29C 70/088 244/117 R |
| 2007/0262617 A1* | 11/2007 | Feith | B62D 25/142 296/205 |
| 2008/0001434 A1* | 1/2008 | Henkelmann | B62D 25/04 296/187.12 |
| 2008/0050571 A1 | 2/2008 | Haque | |
| 2008/0156425 A1* | 7/2008 | Howe | B62D 25/04 156/245 |
| 2008/0268208 A1* | 10/2008 | Martin | B29C 70/16 428/174 |
| 2009/0026315 A1* | 1/2009 | Edelmann | B29C 70/205 244/119 |
| 2009/0041974 A1* | 2/2009 | Gleason | B29C 70/20 428/113 |
| 2009/0053458 A1* | 2/2009 | Birrell | B62D 25/105 428/68 |
| 2009/0095413 A1* | 4/2009 | Westre | E04C 3/29 156/257 |
| 2009/0139643 A1 | 6/2009 | Kouno et al. | |
| 2009/0148700 A1* | 6/2009 | Cavaliere | B29C 70/08 428/376 |
| 2009/0176066 A1* | 7/2009 | Darrow | B29C 70/085 428/175 |
| 2009/0176600 A1 | 7/2009 | Kouno et al. | |
| 2010/0028593 A1* | 2/2010 | Taketa | B29C 43/222 428/113 |
| 2010/0051183 A1* | 3/2010 | Boke | B29C 43/003 156/228 |
| 2010/0092770 A1* | 4/2010 | Wadahara | B29C 43/003 428/339 |
| 2010/0148004 A1* | 6/2010 | Beumler | B32B 15/14 244/119 |
| 2010/0212710 A1* | 8/2010 | Roder | E04C 3/29 135/121 |
| 2010/0227115 A1* | 9/2010 | Esaki | B29C 70/222 428/114 |
| 2010/0266867 A1* | 10/2010 | Roebroeks | B32B 15/08 428/626 |
| 2010/0285265 A1* | 11/2010 | Shinoda | B29B 11/16 428/80 |
| 2011/0206890 A1* | 8/2011 | Belpaire | B62D 29/002 428/68 |
| 2011/0236622 A1* | 9/2011 | Tacke | B32B 1/00 428/114 |
| 2012/0015135 A1* | 1/2012 | Beraud | B29C 70/086 428/74 |
| 2012/0076973 A1* | 3/2012 | Guzman | B29C 70/207 428/113 |
| 2012/0098300 A1* | 4/2012 | Murray | B62D 23/005 296/205 |
| 2012/0193939 A1* | 8/2012 | Howe | B32B 15/14 296/187.01 |
| 2012/0280534 A1* | 11/2012 | Eipper | B62D 21/09 296/187.01 |
| 2012/0309247 A1* | 12/2012 | Kleine | B29C 43/02 442/327 |
| 2012/0328819 A1* | 12/2012 | Motohashi | B29D 99/0003 428/56 |
| 2013/0106138 A1* | 5/2013 | Brockhoff | B29C 70/028 296/187.03 |
| 2013/0108823 A1* | 5/2013 | Beraud | B29C 70/086 428/107 |
| 2013/0108878 A1* | 5/2013 | Kleine | B29C 35/02 428/457 |
| 2013/0122277 A1* | 5/2013 | Ellis | B26D 1/245 428/220 |
| 2013/0154310 A1* | 6/2013 | Neumann | B60G 7/001 296/204 |
| 2013/0257131 A1* | 10/2013 | Nishiura | B60N 2/68 297/452.18 |
| 2013/0299071 A1* | 11/2013 | Wang | B32B 38/0012 156/196 |
| 2013/0334734 A1* | 12/2013 | Takahashi | B29C 70/467 264/257 |
| 2013/0334841 A1* | 12/2013 | Heise | B62D 25/00 296/203.01 |
| 2014/0021747 A1* | 1/2014 | Goettker | B29C 70/48 296/203.01 |
| 2014/0030478 A1* | 1/2014 | Wittenberg | B29C 70/885 428/137 |
| 2014/0139004 A1* | 5/2014 | Matsumoto | B60N 2/68 297/452.18 |
| 2015/0064409 A1 | 3/2015 | Takeuchi et al. | |
| 2015/0174642 A1* | 6/2015 | Krammer | B29C 70/885 29/897.2 |
| 2015/0298399 A1* | 10/2015 | Androsch | B21D 35/006 264/134 |
| 2015/0367889 A1* | 12/2015 | Eipper | B62D 21/15 296/187.03 |
| 2016/0159300 A1* | 6/2016 | Matecki | B23P 15/00 293/120 |
| 2016/0200371 A1* | 7/2016 | Inamoto | B62D 25/04 296/203.01 |
| 2016/0264182 A1* | 9/2016 | Kirtzakis | B62D 25/04 |
| 2017/0001589 A1* | 1/2017 | An | B60R 21/045 |
| 2017/0001670 A1* | 1/2017 | Gruneklee | B62D 25/10 |
| 2017/0341121 A1* | 11/2017 | Kohler | B21D 22/022 |
| 2018/0370162 A1* | 12/2018 | Eyssell | B29C 70/40 |

FOREIGN PATENT DOCUMENTS

| | | | | |
|---|---|---|---|---|
| CN | 101160425 A | | 4/2008 | |
| CN | 101469758 A | | 7/2009 | |
| CN | 202805844 U | | 3/2013 | |
| DE | 3602156 A1 | * | 7/1987 | B62D 29/001 |
| DE | 3843535 A1 | * | 6/1990 | B29C 63/0021 |
| DE | 10017205 A1 | * | 10/2001 | B62D 29/001 |
| DE | 10134372 A1 | * | 1/2003 | B32B 15/08 |
| DE | 10253300 A1 | * | 6/2004 | B29C 70/34 |
| DE | 102005043698 A1 | * | 3/2007 | B62D 29/001 |
| DE | 102005050963 A1 | * | 4/2007 | B22D 19/04 |
| DE | 102006058601 A1 | * | 6/2008 | B29C 65/028 |
| DE | 102009009112 A1 | * | 11/2010 | B62D 25/00 |
| DE | 102011083162 A1 | * | 3/2013 | B29C 70/865 |
| DE | 102011120340 A1 | * | 6/2013 | B21D 53/88 |
| DE | 102012000824 A1 | * | 7/2013 | B62D 25/20 |
| DE | 102012001577 A1 | * | 8/2013 | B60R 13/0861 |
| DE | 102012003731 A1 | * | 8/2013 | B29C 70/506 |
| DE | 102012003734 A1 | * | 8/2013 | B29C 70/465 |
| DE | 102012203888 A1 | * | 9/2013 | B62D 25/04 |
| DE | 102012015990 A1 | * | 2/2014 | B62D 21/152 |
| DE | 102013001040 A1 | * | 7/2014 | B62D 25/025 |
| DE | 102013200523 A1 | * | 7/2014 | B62D 25/04 |
| EP | 0232738 | * | 8/1987 | B62D 29/001 |
| EP | 0995511 A2 | * | 4/2000 | B21D 22/00 |
| EP | 1308265 A1 | * | 5/2003 | B29C 70/202 |
| EP | 1557342 A2 | * | 7/2005 | B62D 25/00 |
| EP | 1792708 A2 | * | 6/2007 | B29C 53/564 |
| GB | 1221135 A | * | 2/1971 | B32B 15/08 |
| GB | 1364076 A | * | 8/1974 | B29C 70/088 |
| GB | 2151185 A | * | 7/1985 | B29C 63/0017 |
| GB | 2152869 A | * | 8/1985 | B29C 70/023 |
| GB | 2260100 A | * | 4/1993 | B29C 70/82 |
| GB | 2421926 A | * | 7/2006 | B29C 70/088 |
| JP | 61063444 A | * | 4/1986 | B32B 37/0007 |
| JP | 04252754 A | * | 9/1992 | |
| JP | 08267665 A | * | 10/1996 | |
| JP | 09314744 A | * | 12/1997 | |
| JP | 10054107 A | * | 2/1998 | |
| JP | 11000959 A | * | 1/1999 | |
| JP | 11210159 A | * | 8/1999 | |
| JP | 11210937 A | * | 8/1999 | |
| JP | 2004017370 A | * | 1/2004 | |
| JP | 2005225364 A | * | 8/2005 | |
| JP | 2005-312646 A | | 11/2005 | |
| JP | 2006111044 A | * | 4/2006 | |
| JP | 2006213312 A | * | 8/2006 | |
| JP | 2007009028 A | * | 1/2007 | |

(56) References Cited

FOREIGN PATENT DOCUMENTS

| JP | 2008290421 A | * | 12/2008 | |
|---|---|---|---|---|
| JP | 2010-149350 A | | 7/2010 | |
| JP | 2014233999 A | * | 12/2014 | |
| WO | WO-8102718 A1 | * | 10/1981 | ............... B64C 1/40 |
| WO | WO-8807954 A1 | * | 10/1988 | ........... B62D 29/001 |
| WO | WO-2005021177 A1 | * | 3/2005 | ............ B21D 22/02 |
| WO | WO-2009014486 A1 | * | 1/2009 | ........... B29C 70/088 |
| WO | WO-2015052352 A1 | * | 4/2015 | ........... B29C 70/088 |
| WO | WO2013-146900 A | | 12/2015 | |

OTHER PUBLICATIONS

Machine Translation of DE-3843535-A1, Jun. 1990 (Year: 1990).*
Machine Translation of JP-10054107-A, Feb. 1998 (Year: 1998).*
Chinese Office Action dated May 4, 2017 issued by the State Intellectual Property Office of People's Republic of China in corresponding Chinese Patent Appln. No. 201580013464.9, with English translation of Chinese Office Action (16 pages).
International Search Report (PCT/ISA/210) dated Jun. 1, 2015, by the European Patent Office as the International Searching Authority for International Application No. PCT/IB2015/051752.
Written Opinion (PCT/ISA/237) dated Jun. 1, 2015, by the European Patent Office as the International Searching Authority for International Application No. PCT/IB2015/051752.
Japanese Office Action dated Jan. 27, 2016, issued by the Japanese Patent Office in the corresponding Japanese Patent Application No. 2014-050751.(with partial English translation) (4 pages).
Office Action (Second Office Action) dated Dec. 12, 2017, by the Chinese Patent Office in corresponding Chinese Patent Application No. 201580013464.9, and an English Translation of the Office Action. (16 pages).

* cited by examiner

[Fig. 1]
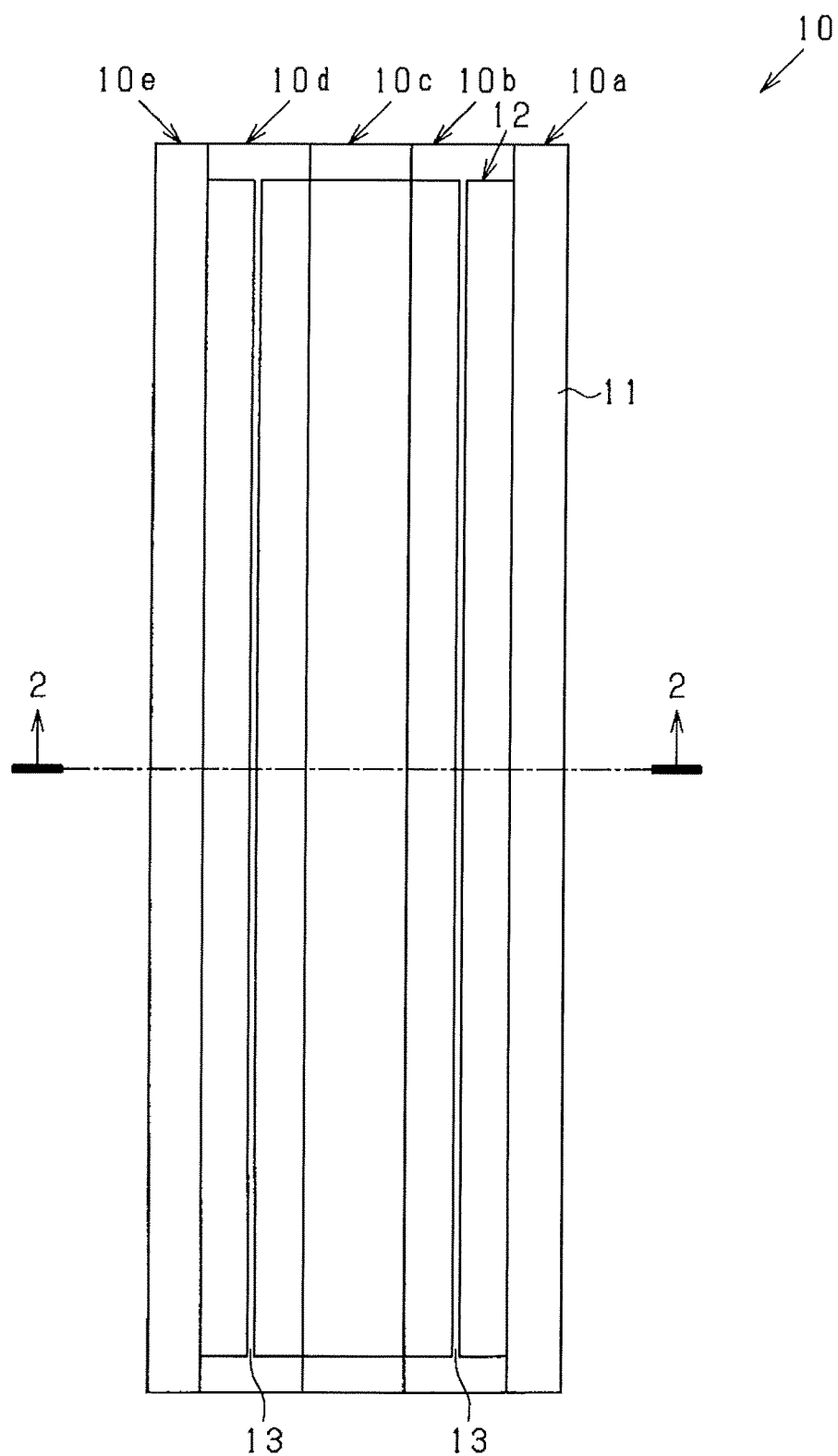

[Fig. 2]
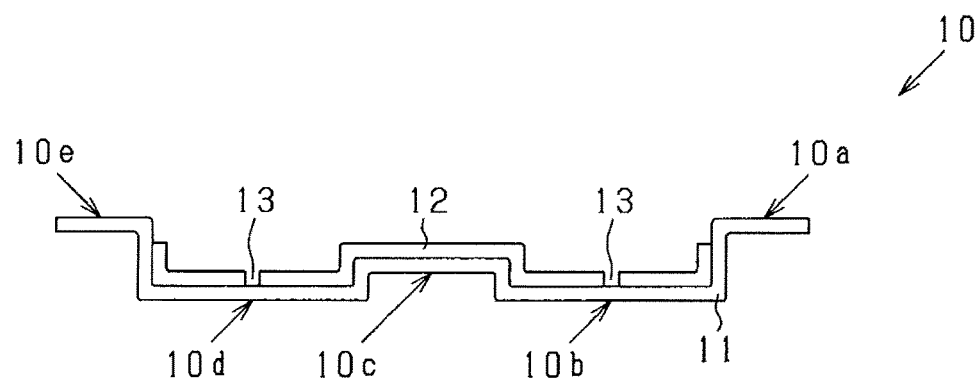
[Fig. 3]
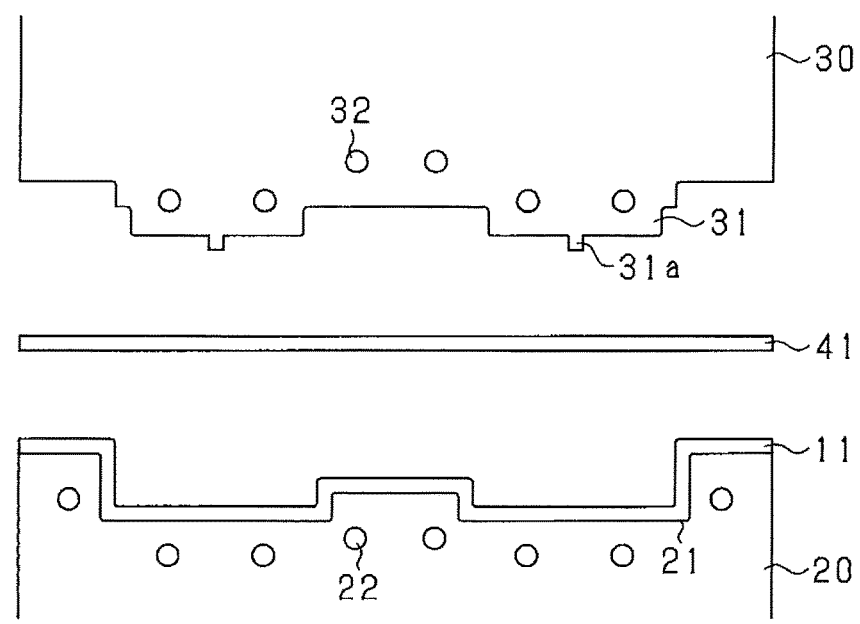

[Fig. 4]
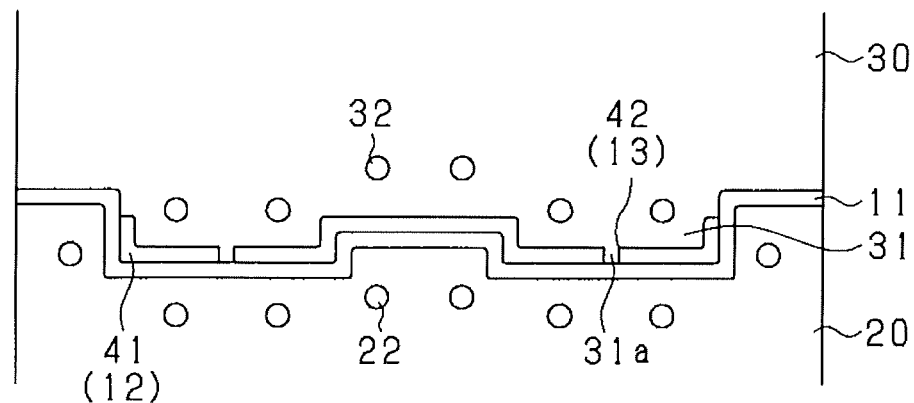
[Fig. 5]
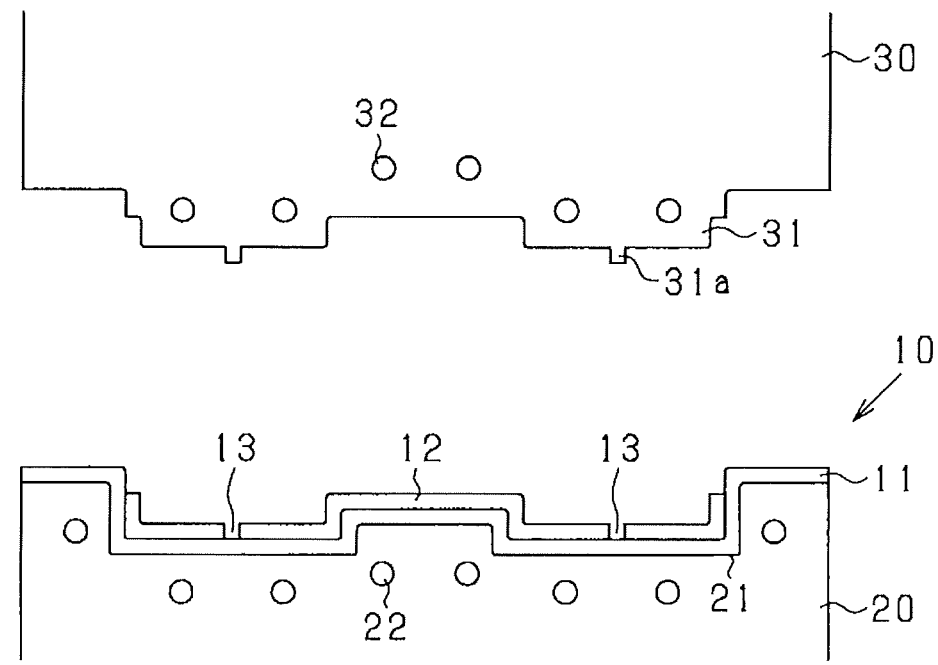

[Fig. 6]
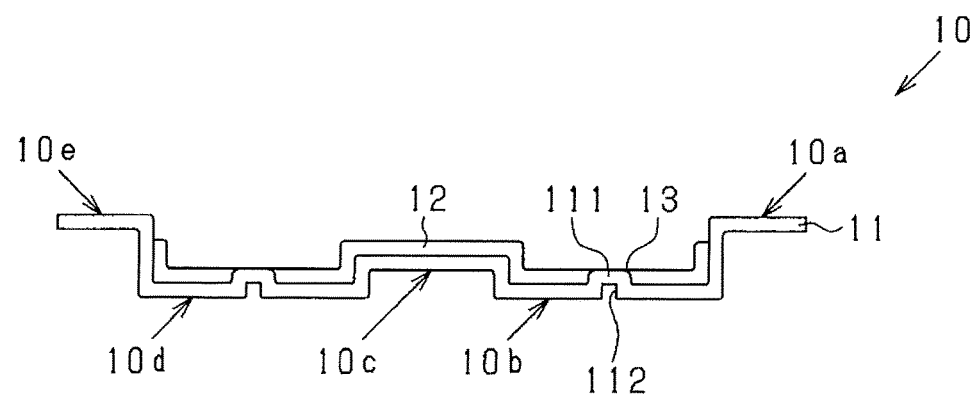
[Fig. 7]
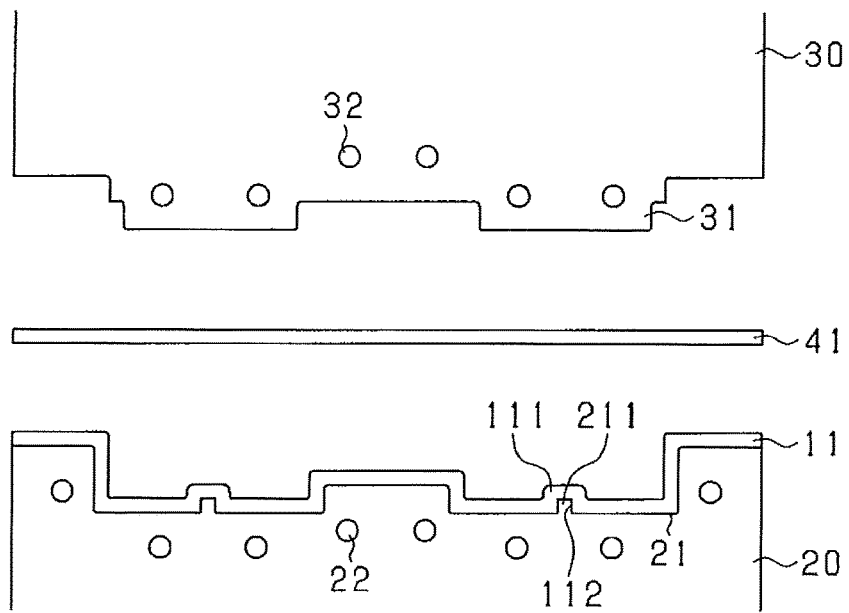

[Fig. 8]
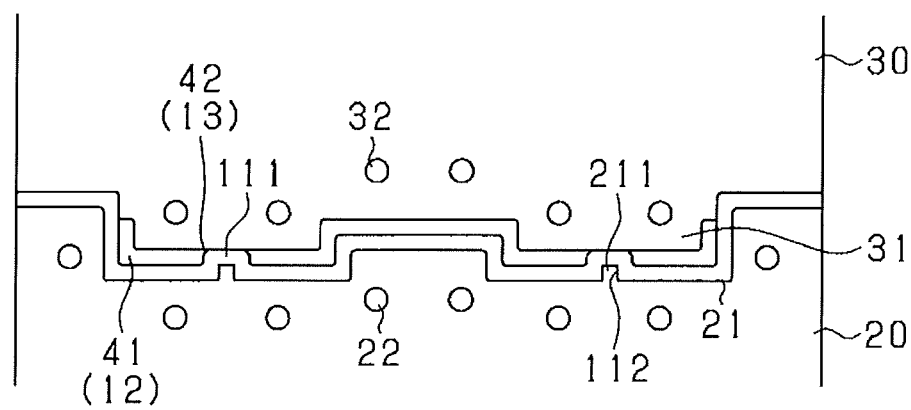
[Fig. 9]
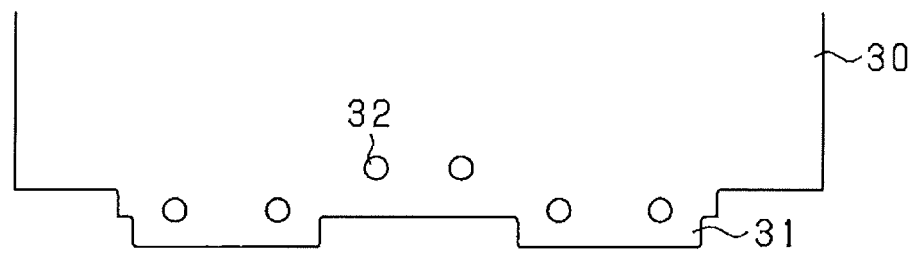
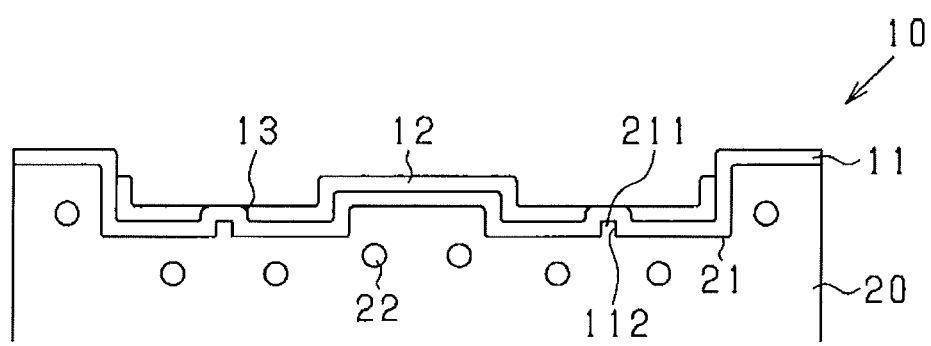

[Fig. 10]
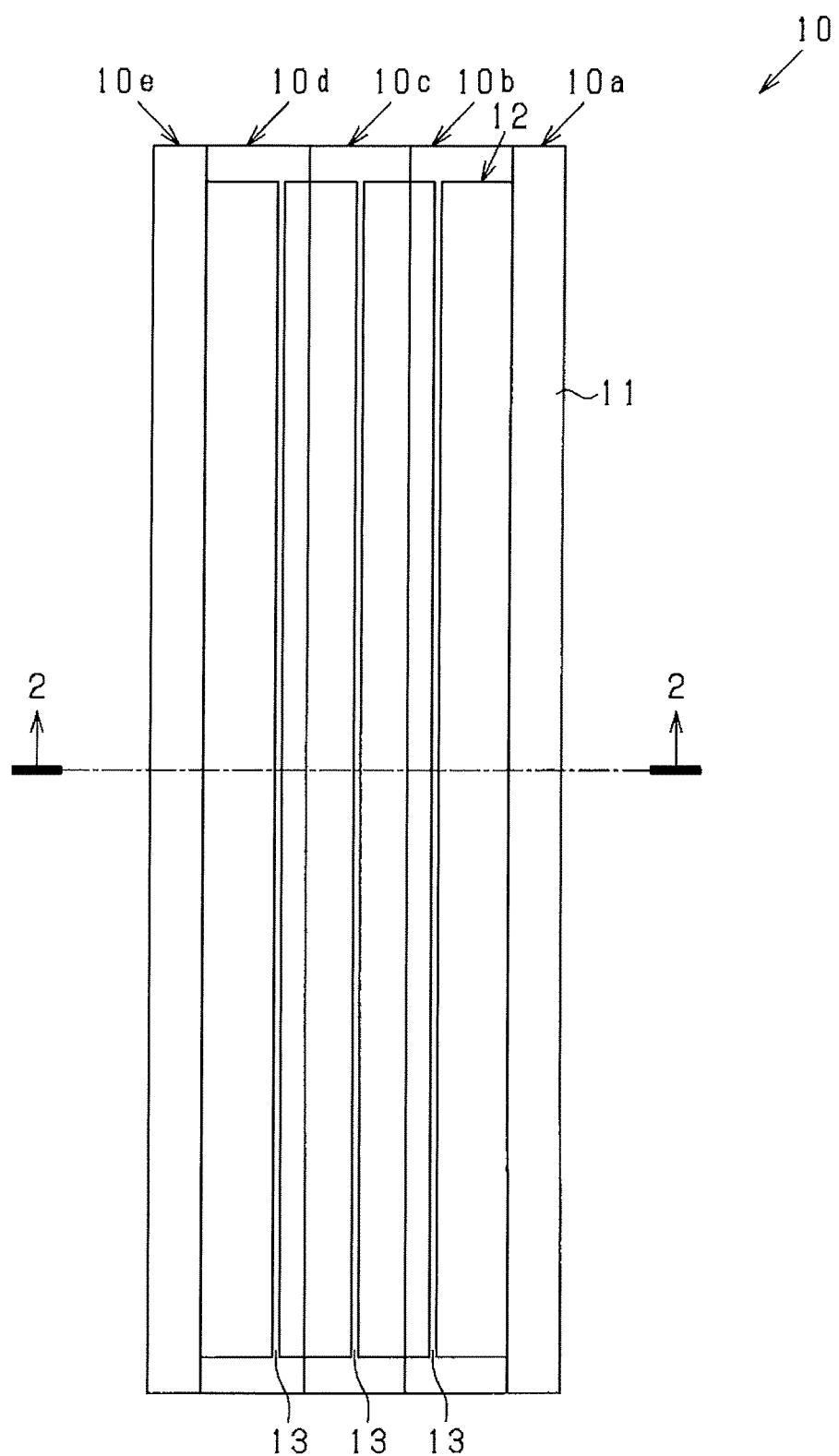

COMPOSITE STRUCTURE AND MANUFACTURING METHOD THEREOF

CROSS-REFERENCE TO RELATED APPLICATIONS

The present application claims priority based on JP Patent Application No. 2014-050751, filed in Japan on Mar. 13, 2014, whose entire disclosure is incorporated herein by reference thereto.

FIELD

The present disclosure relates to a composite structure made of metallic material and fiber reinforced plastic, and a manufacturing method thereof.

BACKGROUND

Those kinds of composite structure and manufacturing method thereof are known, for example, as disclosed in JP2010-149350A (Patent Literature 1: PTL 1) and WO2013-146900A (Patent Literature 2: PTL 2).
[PTL 1]
JP2010-149350A
[PTL 2]
WO2013-146900A

SUMMARY

The following analysis is given by the present invention.

In those kind of composite structure, a bonding site between a fiber reinforced plastic part and a metallic part has a problem with occurrence of strain or delamination, particularly, due to a difference of thermal expansion coefficient between the fiber reinforced plastic part and the metallic part. The present invention is made in view of the situation etc. as exemplified hereinabove.

Considering the hereinabove situation, in a first aspect, there is provided a composite structure, comprising a base member(s) made of metallic material; and a reinforcement member(s) made of fiber reinforced plastic including reinforcement fibers. The reinforcement fibers are aligned in a uni-direction. At least one slit is formed on the reinforcement member(s) so as to extend in an orientation direction of the reinforcement fibers.

In fiber reinforced plastic, there is a difference in an amount of thermal expansion or cooling shrinkage between in an orientation direction of reinforcement fibers (hereinafter, may be referred to simply as "orientation direction") and in a direction crossing (typically orthogonally) the orientation direction. Using uni-directional fiber reinforced plastic, so-called "UD (uni-directional) material", an anisotropy of the expansion or shrinkage is generated depending on the orientation direction. In the UD material, the amount of the expansion or shrinkage in the direction orthogonally crossing the orientation direction is larger than that amount in the orientation direction. Such anisotropy causes the strain or delamination at the bonding site.

In a composite structure according to the first aspect, which is a bonding structure, having the base member(s) made of metallic material and the reinforcement member(s) made of UD material, the slit(s) is formed in the orientation direction of the reinforcement fibers on or in the reinforcement member(s). Accordingly, a length of a bonding site between the reinforcement member(s) and the base member(s) can be shorten in a direction orthogonal to the orientation direction, and an amount of expansion or shrinkage of the reinforcement member(s) is suppressed in the same direction. Therefore, the composite structure can obtain fiber reinforcement properties presented by the UD material in the orientation direction thereof, with suppressing occurrence of strain or delamination in a bonding site(s) between the base member(s) and the reinforcement member(s).

In a preferred composite structure, the reinforcement member(s) including a thermosetting resin is directly bonded with the base member(s). According to such preferred configuration, the composite structure having the hereinabove-mentioned configuration according to the first aspect can be produced through an easy or simply manufacturing process.

In a second aspect, there is provided a manufacturing method of the composite structure having the hereinabove-mentioned configuration:

(i) preparing a pair of dies having at least one protrusion corresponding to the at least one slit;
(ii) setting the base member(s), and a precursor(s) to form the reinforcement member(s) between the pair of the dies in a manner that an orientation direction of the reinforcement fibers is aligned in a longitudinal direction of the at least one protrusion;
(iii) closing the pair of the dies to form a laminated structure having the base member(s) and the precursor(s) of the reinforced member(s), thereby forming the precursor(s) into a preset shape(s) and the at least one slit thereon; and
(iv) heating the laminated structure in the pair of the dies in a closed state of the dies.

According to the second aspect, the composite structure having the hereinabove-mentioned configuration can be produced through an easy or simply manufacturing process.

BRIEF DESCRIPTION OF DRAWINGS

FIG. 1 is a schematic plan view illustrating an approximate configuration of a composite structure according to one exemplary embodiment.

FIG. 2 is a schematic cross-sectional view taken along a line 2-2 in FIG. 1.

FIG. 3 is a schematic view illustrating a manufacturing method according to the one exemplary embodiment.

FIG. 4 is a schematic view illustrating a manufacturing method according to the one exemplary embodiment.

FIG. 5 is a schematic view illustrating a manufacturing method according to the one exemplary embodiment.

FIG. 6 is a schematic cross-sectional view illustrating an approximate configuration of a composite structure according to one modification.

FIG. 7 is a schematic view illustrating a manufacturing method of the composite structure as shown in FIG. 6.

FIG. 8 is a schematic view illustrating a manufacturing method of the composite structure as shown in FIG. 6.

FIG. 9 is a schematic view illustrating a manufacturing method of the composite structure as shown in FIG. 6.

FIG. 10 is a schematic plan view illustrating an approximate configuration of a composite structure according to the other modification.

PREFERRED MODES

Hereinafter, one exemplary embodiment is explained, referring to drawings. In addition, modifications and/or variations are indicated at the end of Description, since the understanding of the explanation of the consistent one exemplary embodiment would be disturbed when such modifications and/or variations are inserted in the explanation of the one exemplary embodiment.

Constitution of Composite Structure

FIG. 1 is a schematic plan view illustrating an approximate configuration of a composite structure according to one exemplary embodiment. FIG. 2 is a schematic cross-sectional view taken along a line 2-2 in FIG. 1. Hereinafter, referring to FIGS. 1 and 2, the composite structure 10 according to the one exemplary embodiment is explained.

The composite structure 10 having a preset longitudinal direction (parallel to an up-down direction in a figure) as shown in FIG. 1 is formed in a "hat" shape (corrugated sheet shape) as shown in FIG. 2. In detail, the composite structure 10 has flange parts 10a, 10e, a first and second U-shaped parts 10b, 10d, and a connecting (intermediate) part 10c.

The flange part 10a is a part of a rectangular flat shape in planar view, having a longitudinal direction parallel to the hereinabove longitudinal direction. The flange part 10a is arranged on one end side in a width direction of the composite structure 10 (orthogonal to the hereinabove longitudinal direction or a thickness direction of the composite structure 10), that is, a light-right direction in a figure. The first U-shaped part 10b is a part formed in an approximate U-shape in sectional view, as shown in FIG. 2. The first U-shaped part 10b has one end connecting to the flange part 10a and the other end connecting to the connecting part 10c.

The connecting part 10c is a part of a rectangular flat shape in planar view, having a longitudinal direction parallel to the hereinabove longitudinal direction. The connecting part 10c is arranged between the first and second U-shaped parts 10b, 10d. The second U-shaped part 10d is a part formed in an approximate U-shape in sectional view, similar (approximately equal) to that of the first U-shaped part 10b. The second U-shaped part 10d has one end connecting to the connecting part 10c and the other end connecting to the flange part 10e. The flange part 10e is a part of a rectangular flat shape in planar view, having a longitudinal direction parallel to the hereinabove longitudinal direction. The flange part 10e has the similar (approximately equal) shape as the flange part 10a.

The composite structure 10 has a base member 11 made of metallic material and bending-formed into the hereinabove-mentioned shape, and a reinforcement member 12 made of CFRP (Carbon Fiber reinforced plastic) and bonded with the base member 11. The composite structure 10 has a lamination (bonding) structure of the CFRP and the metallic material. In particular, the reinforcement member 12 is configurated to include a thermosetting resin in a bonding site with the base member 11, according to the present exemplary embodiment. In the present exemplary embodiment, for example, the reinforcement member 12 impregnated with the thermosetting resin is directly bonded with the base member 11, without an additional adhesive layer.

In the present exemplary embodiment, the composite structure 10 is assumed to be required to have reinforcement in the longitudinal direction. For that assumption, in the present exemplary embodiment, the reinforcement member 12 is only arranged on required preset strength part(s) of the composite structure 10, i.e., the first and second U-shaped parts 10b, 10d, and the connecting part 10c, not arranged on the other parts, i.e., the flange parts 10a, 10e. The reinforcement member 12 is made of material including continuous or long carbon fibers, so-called UD material. To reinforce the composite structure in the longitudinal direction, an orientation direction of the fibers in the reinforcement member 12 is aligned in (e.g., parallel to) the longitudinal direction.

On the reinforcement member 12, slits 13 are formed in (particularly, approximately parallel to) the orientation direction. The slits 13 are extended over an entire length of the reinforcement member 12 in the longitudinal direction. The base member 11 has an inner surface on which the reinforcement member 12 is bonded, the inner surface being partially exposed throughout the slits 13. The slits 13 of the present exemplary embodiment are arranged in middle positions of the first and second U-shaped parts 10b, 10d in width directions thereof, respectively.

<Manufacturing Method>

Hereinafter, a manufacturing method of the composite structure 10 having the hereinabove-mentioned constitution is explained, referring to FIGS. 3-5.

A concave part, i.e., a cavity 21 is formed on a lower die 20, i.e., a fixed die (outer die) of a pair of dies. The lower die 20 has an inner wall surface capable of abutting on an outer surface (arranged on the opposite side of the hereinabove mentioned inner surface) of the base member 11. Inside the lower die 20, heaters 22 for heating are arranged along the inner wall surface of the cavity 21.

Convex parts 31 are formed on an upper die 30, i.e., a movable die (inner die) of a pair of dies, extending or elongating along the inner surface of the base member 11. The convex parts 31 have shapes complementary to the first and second U-shaped parts 10b, 10d. Therefore, the convex parts 31 extend in a longitudinal direction perpendicular to a sheet of FIG. 3.

In approximate central sites in a width direction of the convex parts 31 (orthogonal to the hereinabove longitudinal direction or a projection direction of the convex part 31, that is, a left-right direction in a figure), slit-forming projections 31a are formed. The slit-forming projections 31a are formed in a rail shape, having the approximately equal length as the hereinabove-mentioned slits 13. The slit-forming projections 31a extend parallel to the longitudinal direction of the convex parts 31. Inside the upper die 30, heaters 32 for heating are arranged along the outer surface of the convex parts 31.

First, as shown in FIG. 3, the base material 11 of metallic component is set or disposed in the lower die 20. A prepreg 41 of sheet shape is set or disposed between the upper and lower dies 20, 30. The prepreg 41, which is a precursor of "reinforcement member" of the present disclosure, is made of the UD material including the thermosetting resin before curing. The prepreg 41 is set in a manner that the orientation direction of the reinforcement fibers (the hereinabove-mentioned continuous carbon fibers) included in the prepreg 41 are aligned in (particularly, approximately parallel to) the longitudinal direction of the forming slit projections 31a.

Second, as shown in FIG. 4, the upper and lower dies 20, 30 are closed each other. Thereby, the prepreg 41 is laminated on the base member 11, and simultaneously, formed into a hat shape complied with an inner surface profile of the base member 11. At this time, the forming slit projections 31a intrude into the prepreg 41 to form slits 42 on or in the prepreg 41, the slits 42 having shapes corresponding to the shapes of slits 13.

Next, in a laminated state as shown in FIG. 4, the lamination structure of the prepreg 41 and the base member 11 is heated at the preset temperature for the preset time using the heaters 22, 32. Thereby, a curing reaction of the thermosetting resin included in the prepreg 41 proceeds, so that the reinforcement member 12 with the slits 13 is formed from the prepreg 41, and the base member 11 and the reinforcement member 12 are firmly bonded each other in the laminated state. Thereafter, as shown in FIG. 5, the upper and lower dies 20, 30 are opened to be able to remove the formed composite structure 10 from the dies 20, 30.

<Operation and Effect>

In the composite structure 10 according to the present exemplary embodiment, which is a bonding structure, having the base member 11 made of the metallic material and the reinforcement member 12 made of the UD material, the slits 13 are formed in the orientation direction of the reinforcement fibers on or in the reinforcement member 12. Accordingly, a length of a bonding site between the reinforcement member 12 and the base member 11 can be shorten in a direction orthogonal to the orientation direction, and an amount of expansion or shrinkage of the reinforcement member 12 is suppressed in the same direction. Therefore, the composite structure 10 can obtain fiber reinforcement properties presented by the UD material member(s) in the orientation direction thereof, with a suppressed occurrence of strain or delamination at the bonding site.

Particularly, in a case of bonding the CFRP member(s) including the thermosetting resin and the metallic component(s) each other, both of shrinkages due to a curing reaction on manufacturing process and due to cooling after curing, as well as expansion and shrinkage in use environment of a completed product of the composite structure 10, are problems. As to the problems, according to the configuration of the present exemplary embodiment, even when bonding the reinforcement member 12 formed of the CFRP member(s) including the thermosetting resin with the base member 11 formed of the metallic component(s), the occurrence of strain or delamination at the bonding site can be satisfactorily suppressed.

In the composite structure 10 of the exemplary embodiment, the reinforcement member includes the thermosetting resin in the bonding site with the base member 11. For example, the reinforcement member 12 including the thermosetting resin is directly bonded with the base member 11. According the hereinabove-mentioned configuration, bonding between the base member 11 and the reinforcement member 12 can be well conducted, even if without applying a pretreatment for improving an adhesiveness of the reinforcement member 12 onto the base member 11 (surface treatment: e.g., plating, plasma treatment, and blasting etc.) or a special adhesion layer (bonding layer) arranged between the base member 11 and the reinforcement member 12. In addition, the composite structure 10 having the hereinabove-mentioned configuration can be produced through an easy or simply manufacturing process.

Furthermore, according to the composite structure 10 and the manufacturing method thereof, both of a forming process of the base member 11 and a bonding process between the formed base member 11 and the reinforcement member 12 can be simultaneously conducted, thus contributing to reduce a number of processes and a product cost thereby.

<Modifications>

Several modifications will next be exemplified. In the following description of the modifications, component members similar in structure and function to those of the hereinabove-described exemplary embodiment are denoted by names and reference numerals similar to those of the hereinabove-described exemplary embodiment. The description of the component members appearing in the hereinabove description of the embodiment can be applied as appropriate, so long as no technical inconsistencies are included. Needless to say, even modifications are not limited to those described below. The constitution of the hereinabove-described exemplary embodiment and the constitutions of the modifications to be described below are entirely or partially applicable in appropriate combination, so long as no technical inconsistencies are included.

The present invention is not limited to the specific configurations of the exemplary embodiment to be described hereinabove. For example, the shape of the composite structure 10 is not limited to the hat shape as mentioned hereinabove. For example, the composite structure 10 may have an approximately flat sheet shape. Further, the reinforcement member 12 is not limited to be formed of a CFRP member(s). Furthermore, the orientation direction of the reinforcement member 12 may be set in a direction which inclines at a preset angle to the hereinabove-described longitudinal direction, depending on a direction of internal or external stress generated in actual use of the composite structure 10, or other directions, etc.

As shown in FIG. 6, protrusions 111 for forming the slits 13 may be formed on the base member 11. In this case, on the outer surface side of the base member 11, particularly, on an opposite side of the protrusion 111, recesses, i.e., die protrusion housing parts 112 are formed parallel to the slits 13. The die protrusion housing parts 112 have the approximately same length as the slits 13. A manufacturing of the composite structure 10 of the hereinabove-mentioned modification will next be exemplified, referring to FIGS. 7-9.

According to the present modification, in the cavity 21 of the lower die 20, slit corresponding projections 211 are formed to project toward the upper die 30. The slit corresponding projections 211 are formed in positions and a shape corresponding to the slits 13. The slit corresponding projections 211 are formed to fit into the die protrusion housing parts 112. In contrast, the upper die 30 has no projection as hereinabove-mentioned (see the slit-forming projections 31a as shown in FIG. 3) on the convexes 31.

First, as shown in FIG. 7, the base material 11 is set or disposed in the lower die 20 in a manner that the slit corresponding projections 211 of the lower die 20 fit onto (are housed in) the die protrusion housing parts 112. A prepreg 41 of sheet shape is set or disposed between the upper and lower dies 20,30, in a manner that the orientation direction of the reinforcement fibers included in the prepreg 41 are aligned in (particularly, approximately parallel to) the longitudinal direction of the slit corresponding projections 211.

Second, as shown in FIG. 8, the upper and lower dies 20, 30 are closed each other. Thus, the prepreg 41 is laminated on the base member 11, and simultaneously, formed into the hat shape complied with a inner surface profile of the base member 11. At this time, the protrusions 111 supported on the slit corresponding projections 211 intrude into the prepreg 41 to form slits 42 on or in the prepreg 41, the slits 42 having shapes corresponding to those of the slits 13.

Next, in a laminated state as shown in FIG. 8, the lamination structure of the prepreg 41 and the base member 11 is heated at a preset temperature for the preset time using the heaters 22, 32. Thus, a curing reaction of the thermosetting resin of the prepreg 41 proceeds, so that the reinforcement member 12 with the slits 13 is formed from the prepreg 41, and the base member 11 and the reinforcement member 12 are firmly bonded each other in their laminated state. Thereafter, as shown in FIG. 9, the upper and lower dies 20, 30 are opened to be able to allow the formed composite structure 10 to remove from the dies 20, 30.

The prepreg 41 is may be pre-formed corresponding to the reinforcement member 12. The formed prepreg 41 may be set in the lower die 20 with the base member, before closing of the upper and lower dies 20, 30. Occasionally, instead of setting of the base member 11 in the lower die 20 as shown in FIG. 3, a metallic blank to form the base member 11 may be inserted between the prepreg 41 and the lower die 20. In this case, dies-closing and heating thereafter (see FIG. 4) may result in forming the base member 11 and the reinforcement member 12 simultaneously with bonding the two members 11, 12.

The inner surface of the base member 11 may be processed with the hereinabove-mentioned pretreatment(s), especially if the reinforcement member 12 is made of thermoplastic fiber reinforced plastic. Using the reinforcement member 12 made of the thermoplastic fiber reinforced plastic, a sheet (thermosetting resin precursor sheet) made of thermosetting resin before curing may be inserted between the base member 11 and the reinforcement member 12. In this case, the reinforcement member 12 may be bonded with the base member 11, via an adhesive layer made of the thermosetting resin. According to the configuration and the manufacturing method, bonding between the base member 11 and the reinforcement member 12 made of the thermoplastic FRP can be well conducted, even if without the hereinabove-mentioned pretreatment on the inner surface of the base member 11.

A number and positions of the slits 13 are not particularly limited. For example, the slit 13 may be formed in or on the connecting part 10*c* as shown in FIG. 10.

In this case, the slit 13 arranged in the connecting part 10*c* may be disposed in an approximately central part of the reinforcement member 12 in the width direction. In the first U-shaped part 10*b*, the slit 13 may be disposed toward a side of the connecting part 10*c* compared with a side of an approximately central part of the first U-shaped part 10*b*. Similarly, in the second U-shaped part 10*d*, the slit 13 may be disposed toward a side of the connecting part 10*c* compared with a side of an approximately central part of the second U-shaped part 10*d*.

According to the configuration as shown in FIG. 10, the reinforcement member 12 is divided into four pieces. The four pieces may have approximately the same length of the bonding site with the base member. Accordingly, strain and delamination may be furthermore suppressed at the bonding site.

Needless to say, those modifications which are not particularly referred to are also encompassed in the technical scope of the present invention, so long as the invention is not modified in essence. Those components which partially constitute means for solving the problems to be solved by the present invention and are operationally or functionally expressed encompass, not only the specific structures disclosed hereinabove in the description of the hereinabove exemplary embodiment and modifications, and equivalents thereof but also any other structures that can implement the operations or functions of the components.

The entire disclosures of the hereinabove Patent Literature are incorporated herein by reference thereto. Modifications and adjustments of the exemplary embodiment(s) are possible within the scope of the overall disclosure (including the claims) of the present disclosure and based on the basic technical concept of the present disclosure. Various combinations and selections of various disclosed elements (including each element of each claim, each element of each exemplary embodiment, each element of each drawing, etc.) are possible within the scope of the present disclosure. That is, the present disclosure of course includes various variations and modifications that could be made by those skilled in the art according to the overall disclosure including the claims and the technical concept. Particularly, any numerical range disclosed herein should be interpreted that any intermediate values or subranges falling within the disclosed range(s) are also concretely disclosed even without explicit recital thereof.

REFERENCE SIGNS LIST

10 composite (hybrid) structure
11 base member (layer)
111 protrusion
12 reinforcement member (layer)
13 slit
20 lower die
21 cavity
211 slit corresponding projection
22 heater
30 upper die
31*a* slit forming protrusion
32 heater
41 prepreg

The invention claimed is:

1. A composite structure having an elongated shape in a longitudinal direction, comprising
   a base member made of metallic material, the base member comprising at least one approximately U-shaped cross-section extending in the longitudinal direction, the U-shaped cross-section comprising a bottom surface bounded by side wall surfaces, and
   a reinforcement member made of fiber reinforced plastic on the base member, the reinforcement member including reinforcement fibers which are aligned in a unidirection along the longitudinal direction, wherein the reinforcement member covers at least a portion of both of the side wall surfaces and a portion of the bottom surface contacting the side wall surfaces,
   at least one slit is formed in the reinforcement member at the at least one U-shaped cross-section and extends in the longitudinal direction over an entire longitudinal extent of the reinforcement member, such that
   a portion of the bottom surface of the at least one U-shaped cross-section is exposed via the at least one slit, and
   at least a portion of an end surface of the reinforcement member is exposed at the at least one slit.

2. The composite structure according to claim 1, wherein the reinforcement member includes a thermosetting resin, and is directly bonded on the base member without an additional adhesive layer.

3. The composite structure according to claim 1, wherein the at least one slit is at the portion of the bottom surface equidistant from the side wall surfaces.

4. The composite structure according to claim 1, wherein at least one of the side wall surfaces comprises a flange extending laterally outward from the at least one U-shaped cross-section.

5. The composite structure according to claim 1, wherein the at least one U-shaped cross-section comprise a plurality of U-shaped cross-sections extending in the longitudinal direction, and
   the at least one slit comprise a plurality of slits, with at least one slit at each of the U-shaped cross-sections.

6. The composite structure according to claim 5, wherein the plurality of U-shaped cross-sections comprises a first U-shaped cross-section and a second U-shaped cross-section, wherein adjacent side walls of the first U-shaped cross-section and the second U-shaped cross-section are connected by a connecting part.

7. The composite structure according to claim 6, wherein one or both of side walls of the first U-shaped cross-section and second U-shaped cross-section that are not connected by the connecting part comprise a flange extending laterally outward from the corresponding U-shaped cross-section.

8. The composite structure according to claim 6, wherein the plurality of slits further comprise at least one slit at the connecting part.

9. The composite structure according to claim 1, wherein the reinforcement fibers are carbon fibers.

10. The composite structure according to claim 1, wherein the reinforcement member does not extend over an entire longitudinal extent of the base member.

11. A manufacturing method of a composite structure according to claim 1, comprising:
   preparing a pair of dies having at least one protrusion corresponding to the at least one slit;
   setting the base member, and a precursors to form the reinforcement member between a pair of dies in a manner that the uni-direction of the reinforcement fibers is aligned in a longitudinal direction of the at least one protrusion;
   closing the pair of dies to form a laminated structure having the base member and the precursors of the reinforcement member, thereby forming the precursors into a preset shapes and having the at least one therein; and
   heating the laminated structure between the pair of dies in a closed state.

12. The manufacturing method of a composite structure according to claim 11, wherein the precursor for forming the reinforcement member is a prepreg.

13. The manufacturing method of a composite structure according to claim 11, wherein the base member is not pretreated and the reinforcement member including a thermosetting resin is directly bonded on the base member without an additional adhesive layer.

\* \* \* \* \*